United States Patent [19]

Gernand et al.

[11] 4,152,400

[45] May 1, 1979

[54] METHOD FOR TREATING SULFUR DIOXIDE WITH SORBENT

[75] Inventors: Martin O. Gernand, Baton Rouge, La.; Dale D. Maness, Austin, Tex.; Neville L. Cull, Baker, La.

[73] Assignee: Exxon Research & Engineering Co., Florham Park, N.J.

[21] Appl. No.: 819,049

[22] Filed: Jul. 26, 1977

Related U.S. Application Data

[62] Division of Ser. No. 658,919, Feb. 16, 1976, Pat. No. 4,087,383.

[51] Int. Cl.$^2$ .......................... B01J 8/00; C01B 17/00
[52] U.S. Cl. ..................................... 423/244; 252/190
[58] Field of Search ................ 423/242, 244; 252/190, 252/463

[56] References Cited

U.S. PATENT DOCUMENTS

| 3,816,597 | 6/1974 | Smith | 423/244 |
| 3,985,682 | 10/1976 | Cull et al. | 252/463 |
| 4,085,195 | 4/1978 | Cull et al. | 423/244 |

*Primary Examiner*—O. R. Vertiz
*Assistant Examiner*—Heller Gregory A.

[57] ABSTRACT

Process for preparing shaped base materials for use in solid catalysts for commercial processes. The solid contact material is prepared by pre-soaking a porous solid particulate carrier material in an organic liquid, immersing the carrier without drying in a dilute acid solution for a given time interval, washing, drying and calcining the impregnated carrier. After calcination, the carrier is impregnated with an active material.

11 Claims, No Drawings

METHOD FOR TREATING SULFUR DIOXIDE WITH SORBENT

This is a division of application Ser. No. 658,919, filed Feb. 16, 1976, now U.S. Pat. No. 4,087,383.

BACKGROUND OF THE INVENTION

This invention relates to: a process for preparing improved catalyst and sorbent supports; the supports prepared thereby; catalysts and sorbents comprising these supports; and to processes wherein such catalysts and sorbents are used.

Processes wherein solid contact materials, such as supported catalysts and/or supported sorbents are used, are, of course, well known in the prior art. These include petroleum processes such as catalytic cracking and hydrocracking, reforming and the like and various gas purification processes such as those involving the catalytic conversion of nitrogen oxides in the presence of ammonia or other reducing agent and those involving the adsorption of sulfur oxides.

As is also well known in the prior art, the activity of many, if not all, of these prior art catalysts and sorbents can be altered, and often improved, by an acid treatment of the carrier or support material either before or after the same has been shaped. Generally, however, such acid treatment has adversely affected the strength characteristics of the resulting catalyst or sorbent. This is particularly true with the so-called amorphous carriers such as alumina, silica, titania, zirconia, alumina-silica, silica-alumina and the like. As a result, acid treatment has not heretofore, been generally used in the preparation of catalysts and sorbents. It is, therefore, an object of the present invention to provide a process in which acid treatment could be used to increase the activity of catalysts and sorbents without adversely affecting their strength characteristics.

SUMMARY OF THE INVENTION

In accordance with the present invention, sorbents and catalysts of improved activity are prepared. By the present method, the carrier material is immersed in a presoak liquid and then in an acid solution which is substantially immiscible with the presoak liquid. Immersion in the acid solution is controlled so that the carrier material is etched as desired. Next, the carrier material is removed from the acid solution, washed to remove the acid, dried and calcined. The calcined, etched carrier material is then impregnated by immersion in an impregnating solution containing a dissolved compound which is decomposable into a desired active material, dried and the decomposable compound converted into the desired active material by calcination.

DETAILED DESCRIPTION OF THE INVENTION

The sorbent preparation techniques to be described herein are applicable generally to the preparation of porous granular solid contact materials, particularly shaped or extruded materials, comprising a porous carrier material and an active material which is deposited on the carrier.

The carrier material which can be used in the preparation of catalysts and sorbents according to this invention are porous materials in granular or particulate form. The materials are inorganic refractory substances, which are preferably hydrophilic so that they can be wetted by polar organic liquids and by aqueous impregnating solutions. Typical carrier materials include alumina, silica, silica-alumina, titania, titania-alumina, alumina-zirconia, alumina-thoria, bauxite, magnesia, and the like. Alumina is a preferred carrier material for the preparation of flue gas desulfurization sorbents, and for other catalysts and sorbents as well.

The carrier according to the present invention is in the form of particles or grains in any desired shape. Conventional shapes such as spheres and cylindrical extrudants can be used. However, best results are obtainable when the carrier particle is a more irregular shape, such as Raschig rings or Intalox saddles, the latter being shown and described in U.S. Pat. Nos. 2,639,909 and 3,060,503. These irregular shapes are preferred because packed beds of these shapes have a higher void volume with resultant lower pressure drop than packed beds of more conventional shapes such as spheres and cylinders. The carrier materials can be formed into particles of desired shape by known techniques such as extrusion. It is believed, however, that such shaping techniques cause the formation of a low porosity outer layer on the base material. This less porous covering can significantly interfere with the ingress and egress of fluid reactants and products, thus materially reducing the effectiveness of the catalytic materials. In accordance with the theory, acid treatment techniques are thought to be effective in that they remove this layer.

The shaped carrier particles which are used in the present invention are characterized by a high surface area, generally over 100 square meters per gram, which is due to an internal pore structure. This internal pore structure is well known in the art.

According to the present invention, the carrier particles prior to impregnation are immersed in a polar organic presoak liquid for a time sufficient to fill substantially completely the pores of the carrier. The quantity of presoak liquid is, of course, greater than the total pore volume of the carrier being immersed. The total pore volume of the carrier particles being immersed is computed by multiplying the unit pore volume (i.e. cc/gram) by the quantity (in grams) of carrier material. Immersion times of about 10 minutes are sufficient in most cases to permit the presoak liquid to displace the air in the carrier pores and to fill the pores completely; much shorter times frequently are sufficient. Preferred presoak times are in the range of about 10 minutes to about 2 hours; longer times are permissible. Immersion temperatures ordinarily can range from the freezing point to the boiling point of the presoak liquid. Room temperature (about 25° C. or 77° F.) is quite desirable in most cases. Lower temperatures increase the viscosity of the presoak liquid and thereby reduce the rate of displacement of the presoak liquid by the acid etching solution.

The presoak liquid must be capable of wetting the carrier material. Carrier materials, such as sponge metals, which are not easily wet, and nonwetting liquids such as mercury, are usually avoided. The presoak liquid must also be capable of displacement by the acid etching solution at a rate slow enough to permit control of the extent of acid attack. Other criteria which are desirable in a presoak liquid are: (a) chemical stability; (b) immiscibility or only slight miscibility with the acid solution (to facilitate removal of the acid solution without significant removal of the presoak liquid); and (c) a volatility lower than that of water but not so low as to hamper its removal during the drying and calcination steps.

Aliphatic alcohols containing from 4 to 12 carbon atoms and particularly primary aliphatic $C_5$-$C_{10}$ monohydric alcohols, are preferred presoak liquids. Normal decyl alcohol is a preferred presoak liquid. Because of its greater viscosity it is more slowly displaced than the lower alcohols. The etching process is thus better controlled. 1-pentanol is a good presoak liquid. As isomeric mixture composed predominantly of primary aliphatic monohydric $C_6$ alcohols, commonly known as "oxo alcohol," is another good presoak liquid. An isomeric mixture composed predominantly of primary aliphatic monohydric $C_8$ alcohols, which is also commonly called "oxo alcohol," is also a good presoak liquid. In general, the $C_4$-$C_{12}$, and especially the $C_5$-$C_{10}$, alcohols are good organic presoak liquids. Other classes of organic compounds can also be used as presoak liquids.

The above-named presoak liquids have been found particularly desirable when alumina is the carrier material. There is some variability in the choice of presoak liquids depending on the choice of carrier material, since the readiness with which a presoak liquid is displaced by the acid etching solution is governed in large measure by the degree of interaction between the presoak liquid and the carrier material, which in turn is influenced by the chemical and physical properties of both presoak liquid and carrier.

The preshaped carrier particles can be separated from excess presoak liquid by any suitable method, e.g. removal of the carrier particles from the body of liquid, or draining of the presoak liquid from its container. At this point the pores of the carrier are completely filled with presoak liquid, and some excess liquid may be dragged out of the container of presoak liquid by the carrier. The excess liquid may be drained or blotted from the carrier if desired, although this is not necessary. However, it is essential that the carrier not be dried at this stage. The carrier, without drying is immersed in the acid solution.

The preferred acids must be capable of wetting and interacting with the carrier material but being readily separated from the presoak liquid. Strong acids are preferred since they can achieve the desired etching of the carrier material. In general, the common inorganic acids are desirable. These include hydrochloric acid, sulfuric acid, nitric acid and phosphoric acid. Concentrations of about 10% or less are especially preferred. Organic acids may also be used if desired. The organic acid used should have a relatively high ionization constant in order to insure sufficient etching strength. Values for the ionization constant, Ka, of about $1 \times 10^{-3}$ and higher are desirable. Suitable organic acids include chloroacetic acid, trichloroacetic acid, maleic acid, malonic acid and oxalic acid.

While the inventors do not wish to be bound by any particular theory, it is believed that the improvement in activity for the finished base-active component combination is due, at least in part, to the controlled opening of surface-to-interior pores which had been closed during the shaping process. This mechanism, of course, should not be construed as defining the scope of limitations of the invention, but rather, should be understood as one possible explanation, recognizing that other mechanisms may well play a major part in the effectiveness of this newly discovered procedure.

Once the carrier material has been sufficiently etched, the acid is washed away without substantially removing the presoak liquid. The choice of wash liquid is dependent upon the selection of acid and presoak liquid. Preferably, water is employed as a washing solution, but acetone and lower molecular weight alcohols such as methanol or isopropanol may also be used.

The impregnating solution contains, as its solute, a compound which is decomposable into the desired active material. Thus, for example, in the case of flue gas desulfurization sorbents where the desired active material is cooper oxide, a copper salt such as copper nitrate may be used as the solute. Where the desired active material is another active material, e.g., iron, cobalt, nickel, vanadium, chromium, zinc, cadmium, platinum or palladium, or a compound (usually an oxide) thereof, a decomposable salt of the desired metal is chosen as the solute of the impregnating solution. Ferric nitrate, cobalt nitrate, nickel nitrate, platinum chloride, and palladium chloride are examples of suitable decomposable salts. In general, the desired active material is a metal, a metal oxide, or a mixture of metals or metal oxides, and the solute or decomposable compound is correspondingly a metal salt or a mixture of metal salts. Suitable decomposable metal salts yielding virtually any desired metal oxide are known in the art. The solvent of the impregnating solution is usually water, which has the advantage of low cost and high affinity for the usual carrier materials. Thus, the preferred impregnating solutions are aqueous solutions. However, solvents other than water may be used where desired, provided the desired decomposable compound is soluble therein. Suitable nonaqueous solvents include methanol, ethanol, isopropyl alcohol, dimethyl sulfoxide, and acetonitrile.

The impregnated carrier material is dried and the decomposable compound is converted to the desired active material. Usually, drying and decomposition are separate operations, since most decomposable compounds will be decomposed under normal drying conditions. Calcination in an air atmosphere is a preferred means of decomposing most decomposable compounds into the desired active materials. Thus, for example, a copper salt such as copper nitrate may be converted into copper oxide by heating the carrier particles to a temperature of about 700° F. to about 1200° F., preferably 800°-1000° F., in the presence of air for from 1 to 6 hours, preferably about 3 hours.

The preferred copper concentration on the finished sorbent is in the range of about 2-10%, preferably 4-6% by weight.

Flue gas desulfurization sorbents comprising vanadium pentoxide on silica can also be prepared according to this invention.

Where the desired finished product has a metal rather than a metal oxide as its active material, as, for example, platinum on alumina (which is a known hydrogenation and hydrocracking catalyst) the metal compound (usually a metal oxide) obtained on drying and calcination is reduced to the free metal. Suitable reducing agents are known in the art.

Catalysts and sorbents prepared as described above can be used in known catalytic, adsorption and cyclic chemical reaction processes. Flue gas desulfurization, which is the preferred process of this invention, falls into the third category.

Removal of sulfur dioxide from a waste gas, and subsequent regeneration of the sorbent, can be carried out using a sorbent as described above under known operating conditions. Thus, for example, flue gas containing a minor amount of sulfur dioxide (usually about 0.1–0.5% by volume of $SO_2$ and typically about 0.2–0.3% by volume of $SO_2$) plus some oxygen (usually about 1–4% by volume) is passed into contact with a fixed bed of the above-described surface impregnated sorbent at a space velocity of no more than about 10,000 V/V/Hr., and usually about 1,000 to about 5,000 V/V/Hr., and at a temperature which is appropriate to the particular sorbent material used. In the case of copper oxide on alumina sorbents, the inlet temperature of flue gas as it enters the bed is generally about 600°–900° F., preferably about 650°–800° F. Slightly higher inlet temperatures, e.g., about 700°–1000° F., may be used when the sorbent comprises potassium oxide and vanadium pentoxide on silica, which is another known flue gas desulfurization sorbent. These temperatures are typical flue gas desulfurization temperatures which are known in the art. The active material, e.g., copper oxide, reacts chemically with sulfur dioxide and oxygen. For instance, copper oxide is converted to copper sulfate. The passage of flue gas is stopped and the sorbent is regenerated when the amount of sulfur dioxide in the effluent reaches a predetermined level. For example, if it is desired to remove 90% of the amount of sulfur dioxide contained in a flue gas, the sorption or sulfation cycle is interrupted and the regeneration cycle is begun when the total amount of $SO_2$ in the effluent over a whole sorption cycle reaches 10% of the total amount of $SO_2$ in the entering gas.

The sorbents of this invention can be regenerated with known reducing agents and under known conditions. Suitable reducing agents include hydrogen, carbon monoxide, mixtures of these two, mixtures of either carbon monoxide or hydrogen (or both) with steam, and aliphatic hydrocarbons such as ethane, propane, or the like, either undiluted or mixed with steam. Methane is less desirable than its higher homologues because it is less reactive.

It is desirable to use regeneration temperatures which are approximately the same as the desulfurization temperatures, e.g., inlet temperatures, or about 600°–900° F. when a copper oxide sorbent is used. Since both desulfurization and regeneration are exothermic, sorbent bed temperatures are somewhat higher than gas inlet temperatures.

Sorbents prepared according to the present invention can withstand numerous sorption-regeneration cycles before they must be replaced.

This invention will now be described further by way of the following examples, which examples are included for purposes of illustration rather than limitation.

CONTROL A

Alumina saddles (surface area 221 square meters per gram; pore volume, 0.53 cc. per gram) were allowed to air hydrate overnight. (Weight dry basis 287.63 gm., weight wet basis 309.28 gm., ca. 7.0 weight percent water pick-up.) The saddles were then immersed in 161.8 cc. of a copper nitrate solution (0.3268 gm. of $CuNO_3.3H_2O$ per cc. of solution), allowed to air dry overnight and then calcined for 3 hours at 800° F. The percent copper was determined to be 4.2%. A portion of the above sorbent was tested for flue gas desulfurization (FGDS) activity in a one inch glass unit and showed a 4.1% copper utilization at the 90% $SO_2$ removal level.

EXAMPLE 1

Alumina saddles, which were the same as in the Control A, were soaked in a n-decyl alcohol solution, removed from the alcohol solution and dipped in a 10% HCl aqueous solution for 45 minutes. The acid dipped saddles were then washed several times with deionized water, air dried overnight and then calcined for 3 hours at 1400° F. The saddles were allowed to pick up moisture overnight and a 5.8% moisture pick-up was noted. Twenty-five of the thus processed saddles were dried for 3 hours at 650° F. and tested for pill strength (PLST). The average pill strength was determined to be 10.7 lbs.

Another portion (27.05 gm. $Al_2O_3$ on a dry basis) was copper impregnated as in the Control A to give 4.6 weight percent copper. The resultant sorbent was tested in a 1 inch glass under conditions essentially as in the Control A and showed a 7.9% copper utilization at the 90% $SO_2$ removal level. The test conditions were as follows:
60 cc. sorbent charge
3000 V/Hr./V
2700 ppm of $SO_2$
650° F. temperature

EXAMPLES 2–4

Alumina saddles, as in Example 1, were similarly presoaked in decyl alcohol and dipped in 10% HCl. After dipping the saddles were washed with deionized water until the washings gave only a slight chlorine test. The washed saddles were oven dried overnight at 230° F. and calcined for 3 hours at 1400° F. Pill strengths for varying dip time and compared with a control are shown in Table I.

TABLE I

| Designation | Sorbent type | Presoak Alcohol | Dip time in 10% HCl | PLST (AV) lbs. | Change in Strength |
|---|---|---|---|---|---|
| Control B | Alumina Saddle | None | None | 13.2 | — |
| Control C | Alumina Saddle | None | 45 mins. | 9.4 | −29% |
| Example 1 | Alumina Saddle | 1-decanol | 45 mins. | 10.7 | −19% |
| Example 2 | Alumina Saddle | 1-decanol | 30 mins. | 13.0 | −2% |
| Example 3 | Alumina Saddle | 1-decanol | 20 mins. | 14.3 | +8% |
| Example 4 | Alumina Saddle | 1-decanol | 10 mins. | 12.2 | −8% |

The activity gain achieved in accordance with the instant invention is shown in Table II.

TABLE II

| Sorbent | Dip Time in 10% HCl | % Cu | % Cu Utilization at 90% $SO_2$ Removal |
|---|---|---|---|
| Control A | None | 4.2% | 4.1% |
| Example 1 | 45 mins. | 4.6% | 7.9% |

CONTROL D

Alumina rings (surface area, 174 square meters per gm.; pore volume, 0.55 cc. per gm.) were allowed to hydrate in the air overnight after a prior calcination for 3 hours at 1400° F., resulting in a water pick-up of 6.6%. The hydrated rings (339 grams) were impregnated with a copper nitrate solution (0.327 gm. $Cu(NO_3)_2.3H_2O$ per cc. solution), air dried overnight and then calcined for 3 hours at 800° F. The percent copper on the alumina was 4.3%. A portion of this sorbent was tested for FGDS activity in the 1 inch glass unit.

EXAMPLE 7

Alumina rings (as in Control D) were soaked in decyl alcohol, drained and immersed in a 10% aqueous HCl solution for 45 minutes. After washing thoroughly with water and drying overnight, rings were calcined for 3 hours at 1400° F. The rings were impregnated with a copper nitrate solution, as in CONTROL D. The percent copper on the alumina was determined to be 4.8%. The "acid etched" sorbent was then tested for FGDS activity and the results are shown in Table III.

TABLE III

| Sorbent | Presoak in Alcohol | Wt.% Cu | Diptime 10% HCl | 90% SO$_2$ Removal B.T.Min. | Cu-Utilization |
|---|---|---|---|---|---|
| Control D | None | 4.3 | None | 5.7 | 9.1% |
| Example 7 | Decyl Alcohol | 4.8 | 45 mins | 7.5 | 11.4% |

What is claimed is:

1. A process for the removal of sulfur dioxide from a gas stream containing sulfur dioxide and oxygen which comprises contacting said gas stream in a reaction zone, at the sulfurization conditions, with a particulate sorbent comprising a sorbing metal or metal oxide or a mixture of metals or metal oxides impregnated upon a porous, solid inorganic refractory carrier, said sorbent prepared by a process comprising:
   (a) immersing particles of said porous, solid inorganic refractory carrier in a polar organic presoak liquid so as to substantially completely fill the pores of the carrier, said presoak liquid being capable of wetting the carrier and capable of displacement by the acid etching solution used in step (c) at a rate slow enough to permit control of the extent of acid attack;
   (b) separating said carrier plus absorbed presoak liquid from said presoak liquid;
   (c) immersing said carrier in an acid solution, said acid solution being substantially immiscible with said presoak liquid;
   (d) removing said acid solution from said carrier;
   (e) impregnating the acid solution treated carrier with an impregnating solution containing a decomposable metal compound; and
   (f) drying said carrier and converting said decomposable metal compound to said desired sorbing metal or metal oxide or a mixture of metals or metal oxides.

2. The process of claim 1 wherein said porous solid inorganic refractory carrier is alumina.

3. The process of claim 1 wherein said porous, solid inorganic refractory carrier is hydrophilic.

4. The process of claim 1 wherein said sorbing metal oxide is copper oxide.

5. The process of claim 1 wherein said presoak liquid comprises one or more aliphatic monohydric alcohols containing 4 to 12 carbon atoms.

6. The process of claim 1 wherein the impregnating solution employed in step (e) is an aqueous solution.

7. The process of claim 1 wherein the acid employed in step (c) is a water soluble acid having an ionization constant of at least about $1.0 \times 10^{-3}$.

8. The process of claim 1 wherein the acid component of the acid solution employed in step (c) is hydrochloric acid.

9. A process for the removal of sulfur dioxide from a gas stream containing oxygen and from 0.1 to 0.5 vol. % sulfur dioxide which comprises passing said gas stream at a temperature of from 600° to 900° F. into a reaction zone and contacting the same therein with a particulate sorbent comprising copper oxide impregnated upon alumina at a space velocity of no more than about 10,000 volumes of said gas stream per volume of particulate sorbent per hour, said sorbent prepared by a process comprising:
   (a) immersing alumina particles in a polar organic presoak liquid so as to substantially completely fill the pores of said alumina, said presoak liquid being capable of wetting the alumina and capable of displacement by the acid etching solution used in step (c) at a rate slow enough to permit control of the extent of acid attack;
   (b) separating said alumina plus absorbed presoak liquid from said presoak liquid;
   (c) immersing said alumina in an acid solution, said acid solution being substantially immiscible with said presoak liquid;
   (d) removing said acid solution from said alumina;
   (e) impregnating said acid solution treated alumina with an impregnating solution containing a copper compound which is decomposable to copper oxide; and
   (f) drying said alumina and converting said copper compound to copper oxide.

10. The process of claim 9 wherein said gas stream contains from 1 to 4 vol. % oxygen.

11. The process of claim 9 wherein said presoak liquid comprises one or more aliphatic monohydric alcohols containing 4 to 12 carbon atoms and wherein the acid employed in step (c) is hydrochloric acid.

* * * * *